(12) United States Patent
Kikuchi

(10) Patent No.: US 8,031,562 B2
(45) Date of Patent: Oct. 4, 2011

(54) MASTER DISK FOR MAGNETIC TRANSFER, A METHOD OF DRAWING A MAGNETIC TRANSFER PATTERN, AND A MAGNETIC RECORDING MEDIUM HAVING A TRANSFERRED MAGNETIC TRANSFER PATTERN

(75) Inventor: Hiroto Kikuchi, Nagano (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 0 days.

(21) Appl. No.: 12/910,163

(22) Filed: Oct. 22, 2010

(65) Prior Publication Data

US 2011/0096429 A1    Apr. 28, 2011

(30) Foreign Application Priority Data

Oct. 22, 2009    (JP) ................................. 2009-242963

(51) Int. Cl.
*G11B 11/00* (2006.01)
(52) U.S. Cl. ...................... 369/13.56; 369/13.02; 360/15
(58) Field of Classification Search ............... 369/13.02, 369/13.56; 360/15, 135, 75, 77.07
See application file for complete search history.

(56) References Cited

U.S. PATENT DOCUMENTS

| | | | |
|---|---|---|---|
| 5,668,679 A | 9/1997 | Swearingen et al. | |
| 2011/0096640 A1* | 4/2011 | Kikuchi | 369/13.56 |

FOREIGN PATENT DOCUMENTS

| | | | |
|---|---|---|---|
| JP | 2001-243733 A | 9/2001 | |
| JP | 2002-083421 A | 3/2002 | |
| JP | 3343343 A | 8/2002 | |
| JP | 2006-147139 A | 6/2006 | |
| JP | 3999436 A | 8/2007 | |

* cited by examiner

*Primary Examiner* — Ali Neyzari
(74) *Attorney, Agent, or Firm* — Rabin & Berdo, P.C.

(57) ABSTRACT

A master disk for magnetic transfer of a reference servo signal in a spiral mode, having a pattern including a plurality of dots groups, which are disposed at different radial positions of the master disk with a first pitch, and correspond to the reference servo signal in the spiral mode. Each of the plurality of dot groups includes a plurality of dots, successively disposed with a second pitch along a circumferential direction of the master disk at a same one of the radial positions. Each of the plurality of dots is of a ferromagnetic material, and has four sides, two opposing sides thereof extending in the circumferential direction, and the other two opposing sides thereof extending in a radial direction of the master disk.

4 Claims, 13 Drawing Sheets

MASTER DISK FOR MAGNETIC TRANSFER, A METHOD OF DRAWING A MAGNETIC TRANSFER PATTERN, AND A MAGNETIC RECORDING MEDIUM HAVING A TRANSFERRED MAGNETIC TRANSFER PATTERN

CROSS-REFERENCE TO RELATED APPLICATION

This application is based on, and claims priority to, Japanese Patent Applications No. 2009-242963, filed on Oct. 22, 2009, contents of which are incorporated herein by reference.

BACKGROUND OF THE INVENTION

1. Field of the Invention

The present invention relates to a master disk for magnetic transfer, a method of drawing a magnetic transfer pattern, and a magnetic recording medium having a transferred magnetic transfer pattern. The master disk for magnetic transfer of the invention has a pattern of ferromagnetic material corresponding to a preformatted signal to be transferred. The invention is favorably applied to a magnetic recording medium mounted on hard disk drives (HDDs).

2. Description of the Related Art

Common HDDs conduct read-write of data using a magnetic head flying over a magnetic recording medium (a hard disk) at a height of about 10 nm. The bit information on the magnetic recording medium is stored in concentrically arranged data tracks. The magnetic head is positioned on the data tracks in the data read-write processes. Servo information for positioning the magnetic head is stored on the magnetic recording medium. The servo information is recorded concentrically to the data tracks with a constant angular spacing.

The servo information is generally written by means of a device called a servo writer that records servo signals while positioning the magnetic head by controlling an actuator arm using a push pin.

However, the method of writing the servo information by means of a servo writer has a problem of inaccurate positioning of the servo signals and a problem of increased cost due to fast obsolescence of the servo writer.

In order to cope with these problems, an off-line servo recording technique and a self-servo recording technique have been developed.

The off-line servo recording technique records servo signals using an off-line servo recording device before installing a magnetic recording medium into an HDD. This technique improves accuracy as compared with a servo writing method using a push pin.

The self servo recording technique preliminarily installs a magnetic recording medium that has reference servo signals written therein into an HDD, and then a magnetic head is positioned referring to the reference servo signals in the HDD, thereby final servo signals are written to a plurality of magnetic recording media. Recording quality in this technique is determined by the reference servo signals. This technique is effective in a device cost.

The reference servo signals employed in the self servo recording technique include a reference servo signal in a spiral mode as disclosed in U.S. Pat. No. 5,668,679, Japanese Unexamined Patent Application Publication No. 2006-147139, and Japanese Unexamined Patent Application Publication No. 2001-243733, for example.

The recording technique of the reference servo signal in the spiral mode will be described with reference to FIG. 9. FIG. 9 illustrates a magnetic recording medium (a hard disk) 200 mounted on a spindle motor (not illustrated), a pivot-rotating actuator arm 13 and a magnetic head 12, two crush stops 17 and 18, and a voice coil motor 14.

The actuator arm 13 is driven by exciting the voice coil motor 14, thereby moving the magnetic head 12 in a radial direction. While the magnetic recording medium 200 is rotated and the magnetic head 12 is moved from the outer circumference to the inner circumference of the magnetic recording medium 200 in a constant speed, a reference servo signal is recorded in a spiral track 100, as shown in FIG. 9. The spiral track 100 having the recorded reference servo signal includes embedded timing information (for example, missing bit information). Thus, a specified number of spiral tracks 100 are recorded on the magnetic recording medium 200.

Positioning using the spiral reference signal is performed on the following basis. FIG. 10 illustrates a reproduced waveform when the magnetic head 12 crosses over one spiral track 100 in a process of signal reproduction on the same single circle on the magnetic recording medium 200 having spiral tracks 100 written thereon while floating the magnetic head 12.

As shown in FIG. 10, the reproduced waveform has an overall configuration of a leaf and contains periodic timing signals 101. With radial movement of the magnetic head 12, the timing signal 101 does not shift, and the peak position 102 of the reproduced signal shifts. An angular position of the magnetic recording medium 200 is detected by the timing signal 101, and an amount of movement in the radial direction of the magnetic head 12 can be known by the shift of the peak position 102 of the reproduced waveform. The position information is used for positioning the magnetic head 12.

When a reference servo signal is recorded by an off-line servo writing process, for example, based on the above-described method and the magnetic recording medium is installed in an HDD to execute self servo writing, an accurate servo signal is obtained with reduced device costs.

In the above-described method, however, it takes extraordinarily long time to write the reference servo signal, producing a problem of high costs due to low productivity. In order to cope with this problem, a method has been proposed in which servo information is recorded altogether on a magnetic recording medium by a magnetic transfer technology using a master disk carrying the servo information in place of writing the servo information using a magnetic head. Japanese Unexamined Patent Application Publication No. 2002-083421, for example, discloses a method of transferring servo information to a perpendicular magnetic recording medium using a master disk carrying the servo information in a servo pattern formed of a ferromagnetic material.

FIG. 11 illustrates a principle of magnetic transfer called an edge transfer process to a perpendicular magnetic recording medium.

Referring to FIG. 11, a master disk 300 for magnetic transfer is provided with a pattern 305 of protrusions and recesses of a ferromagnetic material, preferably a soft magnetic material. A medium 200 to be transferred is made in close contact with the master disk 300 and an external magnetic field 406 is applied by magnets 400 generating a leakage magnetic flux 407 which penetrates into the medium 200. A magnetic recording layer 208 of the medium 200 is magnetized as indicated by the reference numeral 209, transferring a magnetic signal according to the pattern 305 on the master disk 300.

The magnets 400 are arranged above and below the master disk 300 and the medium 200 to be transferred. The upper and lower magnets are rotated together transferring entire information at once, as shown in FIG. 11.

Another method of magnetic transfer called a bit transfer process is also known as shown in FIGS. 12(*a*) and 12(*b*). Describing more in detail, a first magnetic field is applied in an approximately perpendicular direction to the surface of the medium 200 to be transferred by a magnet 400 as shown in FIG. 12(*a*), to magnetize the medium 200 to be transferred in one direction (an initialization step).

Then as shown in FIG. 12(*b*), a master disk 300 is made in close contact with the medium 200 to be transferred, and a magnetic field 406 in a direction opposite to the first magnetic field (that has been applied in the initialization step) is applied by a magnet 400. In this second magnetic field application, magnetic field hardly passes through recessed parts of the ferromagnetic pattern 305 formed on the master disk 300, leaving the magnetization in the direction of the first magnetic field. At protruding parts of the ferromagnetic pattern 305, a large amount of magnetic flux passes through the medium 200 magnetizing the medium in the direction of this second magnetic field as indicated by the reference number 209. As a result, a magnetization pattern is transferred according to the pattern of protrusions and recesses, the ferromagnetic pattern 305, formed on the surface of the master disk 300 (a transferring step).

A method of manufacturing a master disk 300 is disclosed in Japanese Patent No. 3999436 and Japanese Patent No. 3343343, for example.

Japanese Patent No. 3999436 discloses a method of manufacturing a master disk for magnetic transfer as follows. A disk having photoresist applied thereon is irradiated with an electron beam while rotating, to draw a pattern on the photoresist corresponding to the information to be transferred. After a development process, a pattern of protrusions and recesses is formed to obtain an original disk. After that, nickel electroforming is conducted on the original disk to produce a metal mould, which is then peeled off to obtain a metal disk of nickel. Then, a soft magnetic film is deposited on the pattern of protrusions and recesses on the metal disk of nickel to manufacture a master disk for magnetic transfer.

Japanese Patent No. 3343343 discloses a method of manufacturing a master disk for magnetic transfer as follows. A photoresist is applied on a nonmagnetic substrate. The photoresist is patterned corresponding to the information to be transferred by a lithography method exposing to an electron beam followed by a development process. Subsequently, a configuration of protrusions and recesses corresponding to the information to be transferred is formed on the nonmagnetic substrate by means of a dry etching method or the like. Then, a ferromagnetic thin film is deposited by a sputtering method or the like. After that, the resist film and the excessive ferromagnetic thin film formed on the resist film are removed by a lift-off method, to manufacture a master disk for magnetic transfer with a structure having ferromagnetic films embedded at the recessed parts.

However, in the method of manufacturing a master disk for magnetic transfer, as described above, the pattern is formed using an electron beam lithography apparatus by drawing the pattern while rotating the substrate. This electron beam lithography is generally executed while rotating the substrate thereby scanning the electron beam along concentric circles.

Meanwhile, the reference servo signal in the spiral mode as described previously is recorded while moving the actuator arm, resulting in a shape as shown in FIG. 13. Each dot 2 of the pattern written on the spiral track 100 by the magnetic head has a shape of approximately parallelogram in which the side A is tilted with a certain angle with respect to the circumferential direction of the concentric circles. Here, the word "approximately" shows the following meaning. The data tracks are not straight lines. Hence, the sides extending along the circumferential direction have slight curvature deviating from the parallelogram shape. Also, "a shape of approximately parallelogram" includes slightly deformed shape of parallelogram, such as slightly nonparallel sides. In addition, a shape of parallelogram includes a rectangular shape.

Such a figure is difficult to be drawn by the drawing scheme of scanning the electron beam in the circumferential direction. Even in the case of drawing a shape near such a figure, the scanning pitch must be very fine, producing a problem of increased drawing time.

SUMMARY OF THE INVENTION

In view of the above issues, it is an object of the present invention to provide a master disk for magnetic transfer having a reference servo pattern for magnetic transfer, the pattern being in correspondence with a reference servo signal in a spiral mode and suited to a drawing process of scanning an electron beam in a circumferential direction. It is also an object of the present invention to provide a method of drawing such a pattern for magnetic transfer. It is a further object of the present invention to provide a magnetic recording medium having such a pattern of magnetic transfer transferred thereon.

In order to attain the above objects, a master disk for magnetic transfer according to the present invention has a pattern of a ferromagnetic material corresponding to a preformatted signal to be transferred, the preformatted signal being a reference servo signal in a spiral mode to specify a radial position of a track. The pattern of ferromagnetic material corresponding to the reference servo signal comprises a plurality of dots, each dot having a shape of approximately parallelogram with two opposing sides extending in the circumferential direction of concentric circles and other two opposing sides extending in the radial direction. The plurality of dots composes a plurality of dot groups, each dot group consisting of two or more dots successively arranged along a circumferential direction at the same radius with a predetermined pitch. The plurality of dot groups is arranged at different radial positions with a predetermined pitch in an overall configuration of a spiral.

The number of dot groups corresponding to one track is preferably ten or more in order to ensure positional accuracy.

A method of drawing a pattern for magnetic transfer according to the present invention is a method of drawing the pattern of the master disk for magnetic transfer of the invention in which the drawing process is carried out by rotating the substrate to be drawn thereby scanning the electron beam in a circumferential direction and by blanking operation on the electron beam corresponding to the dot groups, the scanning processes being executed ten or more times in one track.

A magnetic recording medium according to the present invention has the reference servo signal that is magnetically transferred using the master disk for magnetic transfer of the invention.

According to the invention, a plurality of dots composing a pattern corresponding to a reference servo signal in a spiral mode are composed of a plurality of dot groups, each dot group comprising two or more dots strung in a circumferential direction of the same radius with a predetermined pitch. Therefore, a pattern fulfilling a required accuracy is drawn with ease and in a short time by a drawing process of scanning an electron beam in a circumferential direction.

BRIEF DESCRIPTION OF THE DRAWINGS

FIGS. 18(a) and 18(b) show an outline construction of an electron beam lithography apparatus used in an embodiment example according to the invention, in which FIG. 18(a) is a side view and FIG. 18(b) is a top plan view.

DETAILED DESCRIPTION OF THE INVENTION

Figure 1:
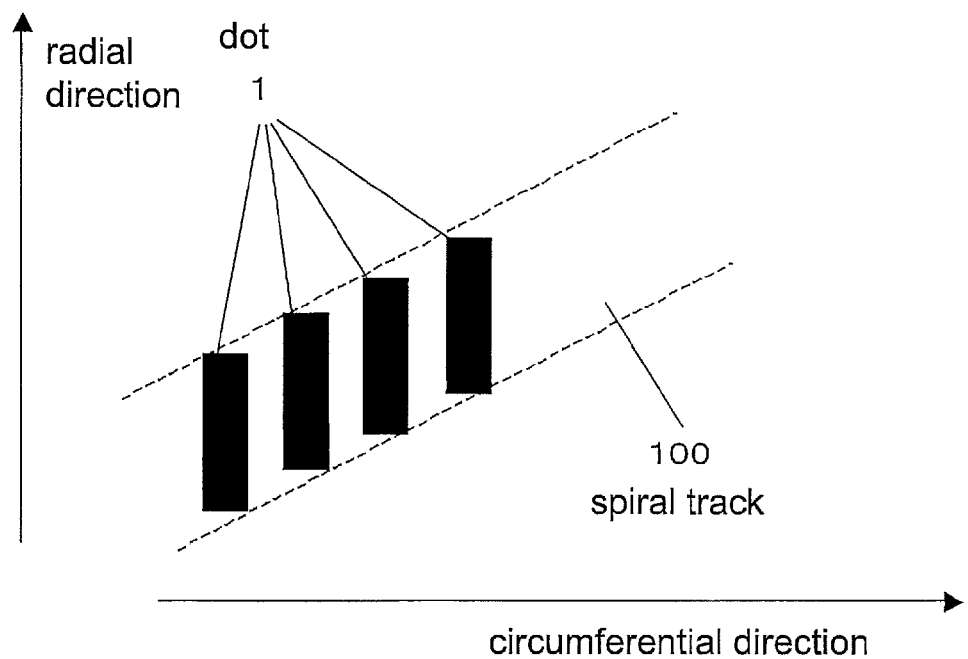
FIG. 1 illustrates an example of configuration of dots composing a pattern corresponding to a reference servo signal in a spiral mode in the present invention on a plane of the abscissa corresponding to a circumferential direction of data tracks and the ordinate of the radial direction.

Now, an aspect of embodiment according to the present invention will be described with reference to the accompanying drawings. In the drawings, the same or equivalent parts are given the same symbol and description thereon is omitted.

FIG. 1 illustrates an example of configuration of dots composing a pattern corresponding to a reference servo signal in a spiral mode in the present invention on a plane of abscissa axis corresponding to a circumferential direction of data tracks and radial direction as ordinate axis.

This pattern corresponding to a reference servo signal comprises, as shown in FIG. 1, a plurality of dots 1 of a ferromagnetic material having a shape of approximately parallelogram with two opposing sides extending along circumferential direction of concentric circles and other two opposing sides extending along the radial direction.

Figure 2:
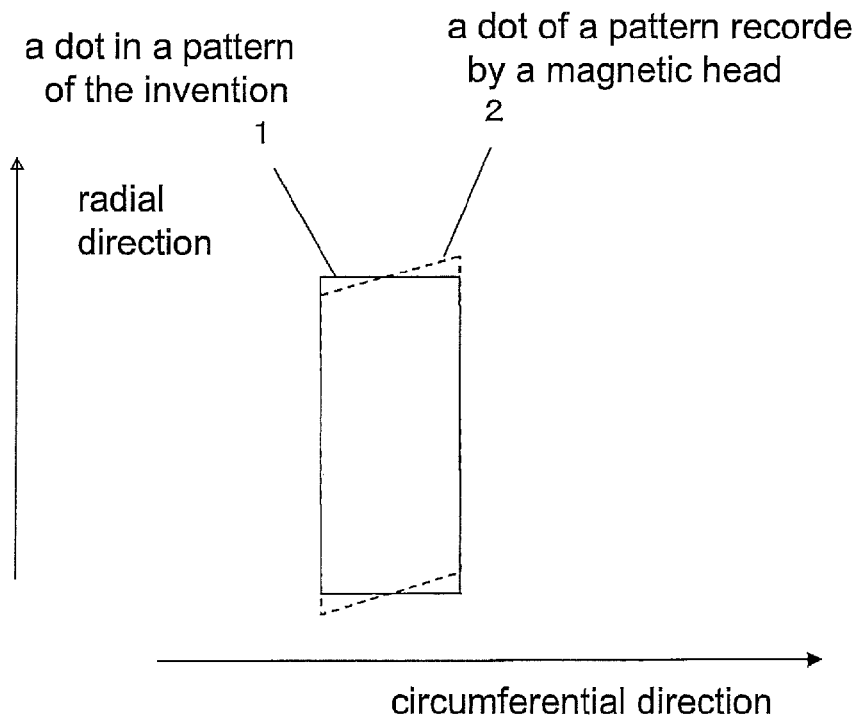
FIG. 2 illustrates the configuration of a dot shown in FIG. 1 in comparison with the one recorded using a magnetic head.

Comparing this shape of the dot 1 with a shape of dot 2 that is recorded using a magnetic head as shown in FIG. 2, different area is sufficiently small in the bit width and the peak position of a reproduced waveform does not change from the one recorded using a magnetic head, which means that the dots can be treated as equivalent to those recorded using a magnetic head. On the other hand, the pattern of the embodiment can be drawn easily by a drawing method of scanning an electron beam along a concentric circle.

The following describes a spiral arrangement of the dot pattern. First, a description concerning a tilting angle of the spiral configuration is made with reference to a specific example.

The reference servo signal of this specific example is a signal comprising a timing bit of "1100" recorded on a spiral track 100 and burst signals of 22 times of "10" repeated until the next timing bit. The timing bit and burst signals are repeatedly recorded on the spiral track 100 with a set of total 48 bits.

Figure 3:
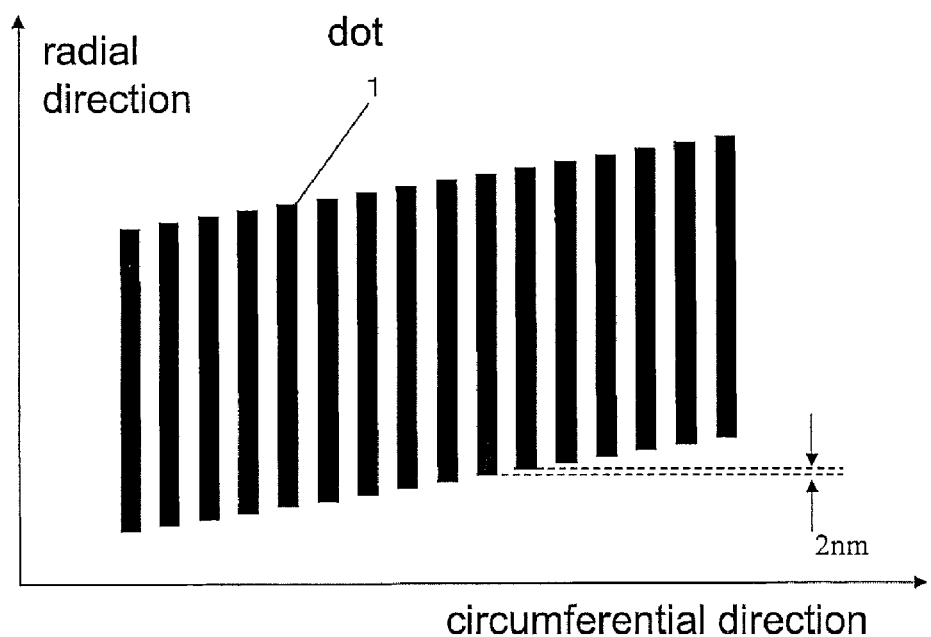
FIG. 3 shows arrangement of dots in a pattern corresponding to a reference servo signal in a spiral mode in Comparative Example using the dots shown in FIG. 1.

The number of bits along one round on the disk is supposed to be 103,680. When a tilting angle of the spiral is such an angle that a half track is a period from a timing bit to the next timing bit (with assumption of one track of 96 nm), an arrangement of 48 bits creates a shift of 48 nm in radial direction. If the drawn bits are shifted uniformly in the radial direction, a shift of 2 nm in the radial direction is needed for one dot in this arrangement, as shown in FIG. 3.

For drawing the dots in this arrangement, a scanning pitch in the drawing process must be at most 2 nm and drawing of one track (96 nm) needs 48 times of scanning, which requires impractically long time.

Figure 4:
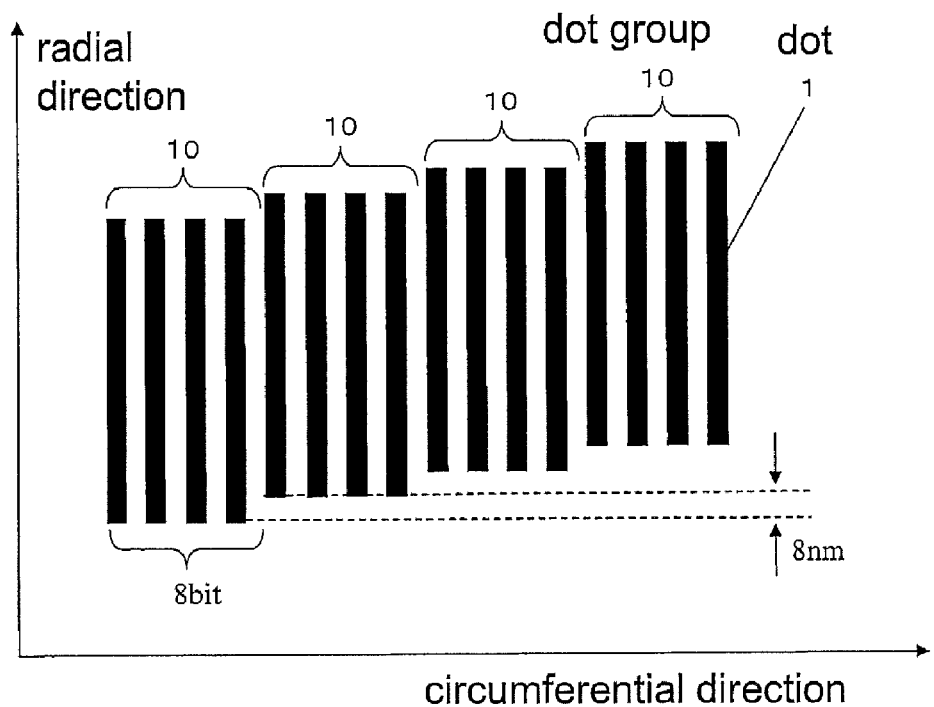
FIG. 4 shows arrangement of dots in a pattern corresponding to a reference servo signal in a spiral mode in an aspect of embodiment according to the invention.

Consequently, successive plural dots are arranged along the same circumference and groups of dots are shifted stepwise, thereby increasing a scanning pitch. In the above-mentioned specific example as shown in FIG. 4, 8 bits of dots compose one dot group 10 and arranged along the same circumference, and then, the scanning dot group is shifted in the radial direction by an amount of one scanning pitch, arranging the next one dot group of 8 bits again.

In this case, scanning pitch in the radial direction is 8 nm and one track of drawing is performed by 12 times of scanning processes.

Figure 5:
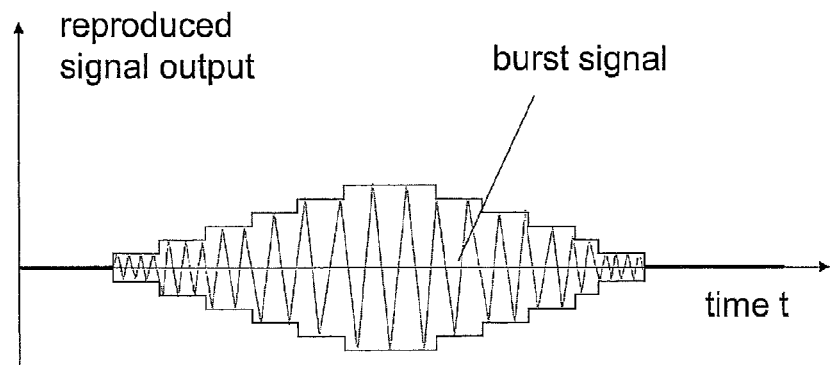
FIG. 5 is a reproduced waveform of the reference servo signal of FIG. 4.

The reproduced signal in this pattern has a stepwise shape as shown in FIG. 5. Since one track is represented by 12 steps, the positional accuracy can be considered to be 1/12=8.3%.

Accurate positioning of the magnetic head requires positioning accuracy of 10%, which is satisfied by the above described example of pattern.

A positioning accuracy in the present method is determined by the number of scanning processes for drawing one track. When a positioning accuracy not larger than 10% is intended, drawing must be performed with a scanning pitch such that one track is drawn by ten or more times of scanning processes.

Features of the invention as described above provide a reference servo pattern suited to a drawing method in which an electron beam is scanned in the circumferential direction. A master disk for magnetic transfer having such a reference servo pattern comprises a pattern of ferromagnetic material corresponding to the reference servo pattern as shown in FIG. 4. The pattern includes a plurality of dots 1, each dot having a shape of approximately parallelogram with two opposing sides extending along the circumferential direction of concentric circles and other two opposing sides extending along the radial direction. The plurality of dots 1 are grouped together to form a plurality of dot groups 10, each dot group comprising two or more successive dots arranged in the circumferential direction of the same radius with a predetermined pitch. The plurality of dot groups 10 is disposed with a predetermined pitch at different radial positions in an overall configuration of a spiral.

The following describes a procedure of drawing this reference servo pattern with reference to FIGS. 14 through 18.

In each of FIGS. 14 through 17, a spiral pattern to be drawn and a scanning pitch are shown in the upper part of the figure; and a signal for controlling blanking operation to turn electron beam irradiation ON/OFF is shown in the lower part of the figure. The electron beam is shot in the period of "ON".

Figure 14:
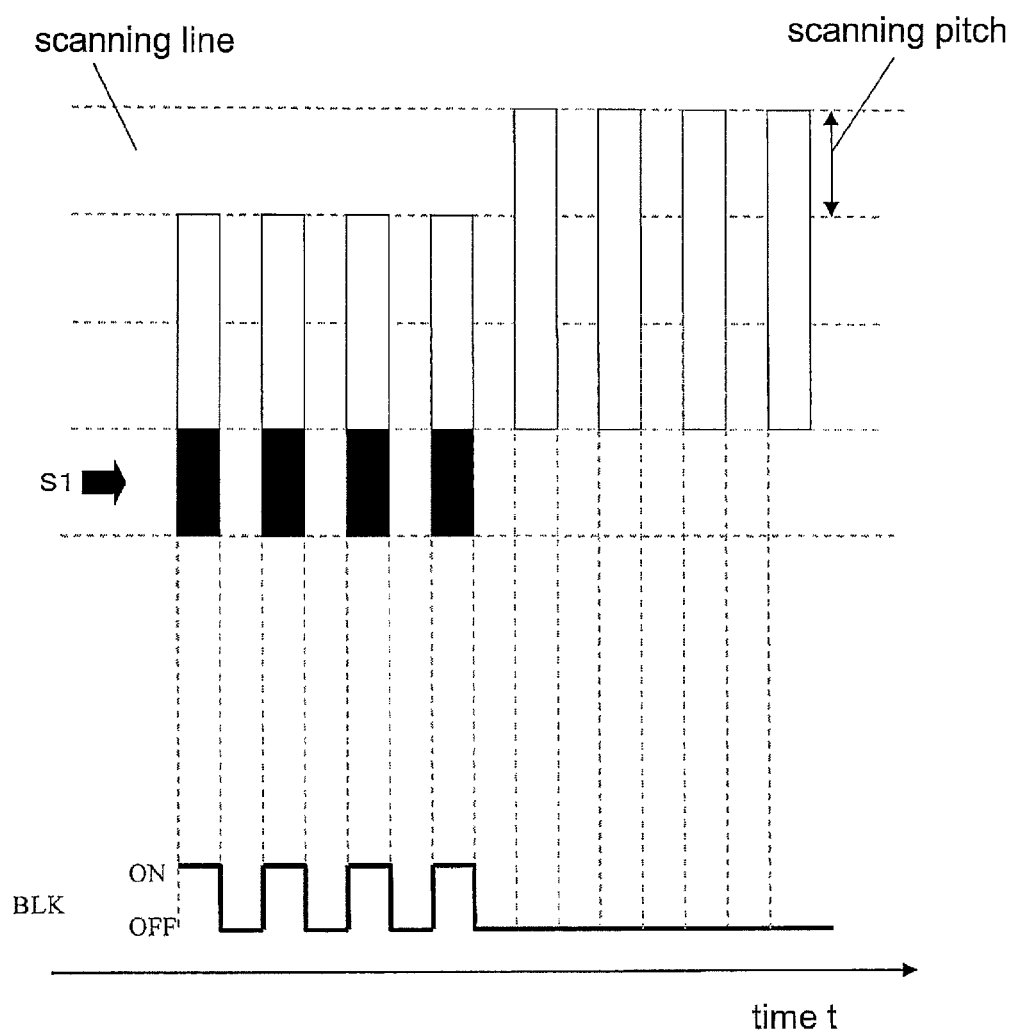
FIG. 14 is a timing chart showing a state in the process of scanning the line S1 by a drawing method according to an aspect of embodiment of the present invention.

FIG. 14 shows a state of drawing a scanning line S1. The places to be drawn are irradiated with the electron beam by turning the blanking signal BLK ON. In the scanning of S1 as shown in FIG. 14, four dots from the left on the scanning line are drawn (filled with black in the figure).

Figure 15:
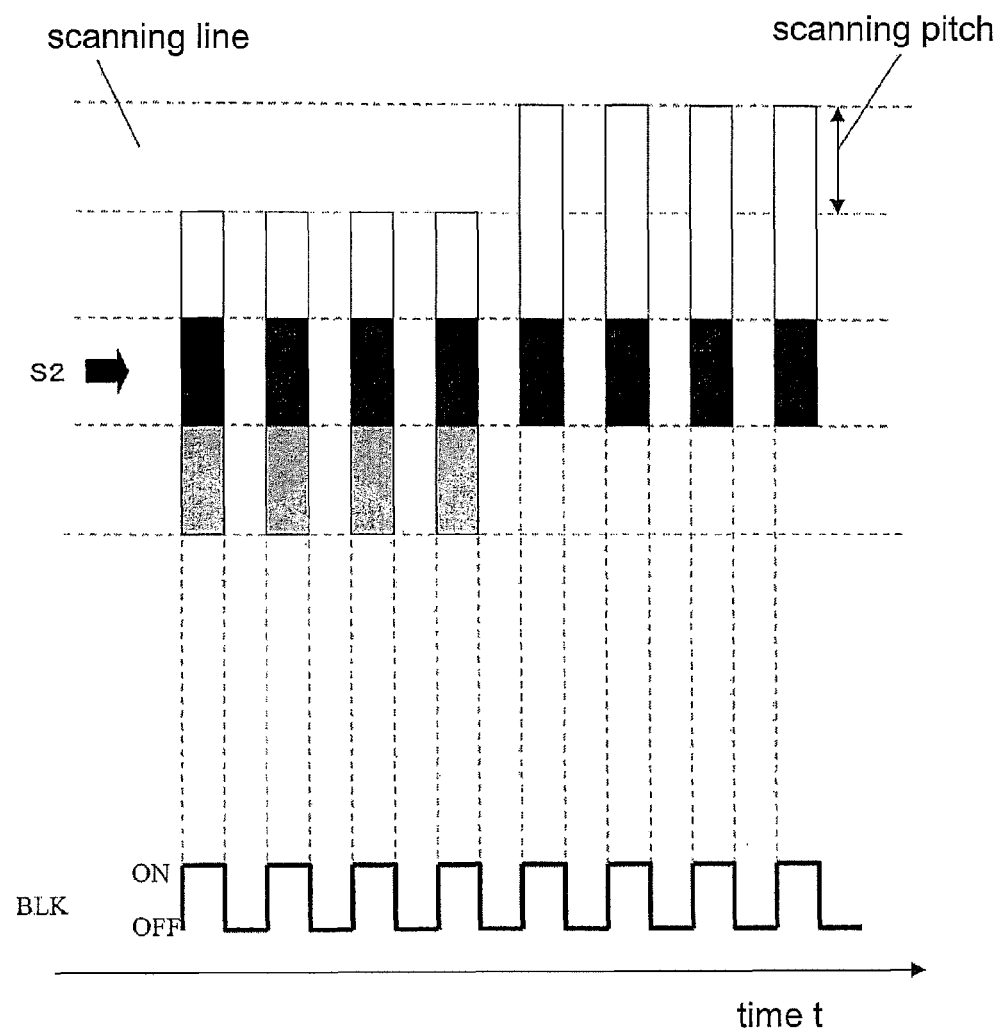
FIG. 15 is a timing chart showing a state in the process of scanning the line S2 by a drawing method according to an aspect of embodiment of the present invention.
Figure 16:
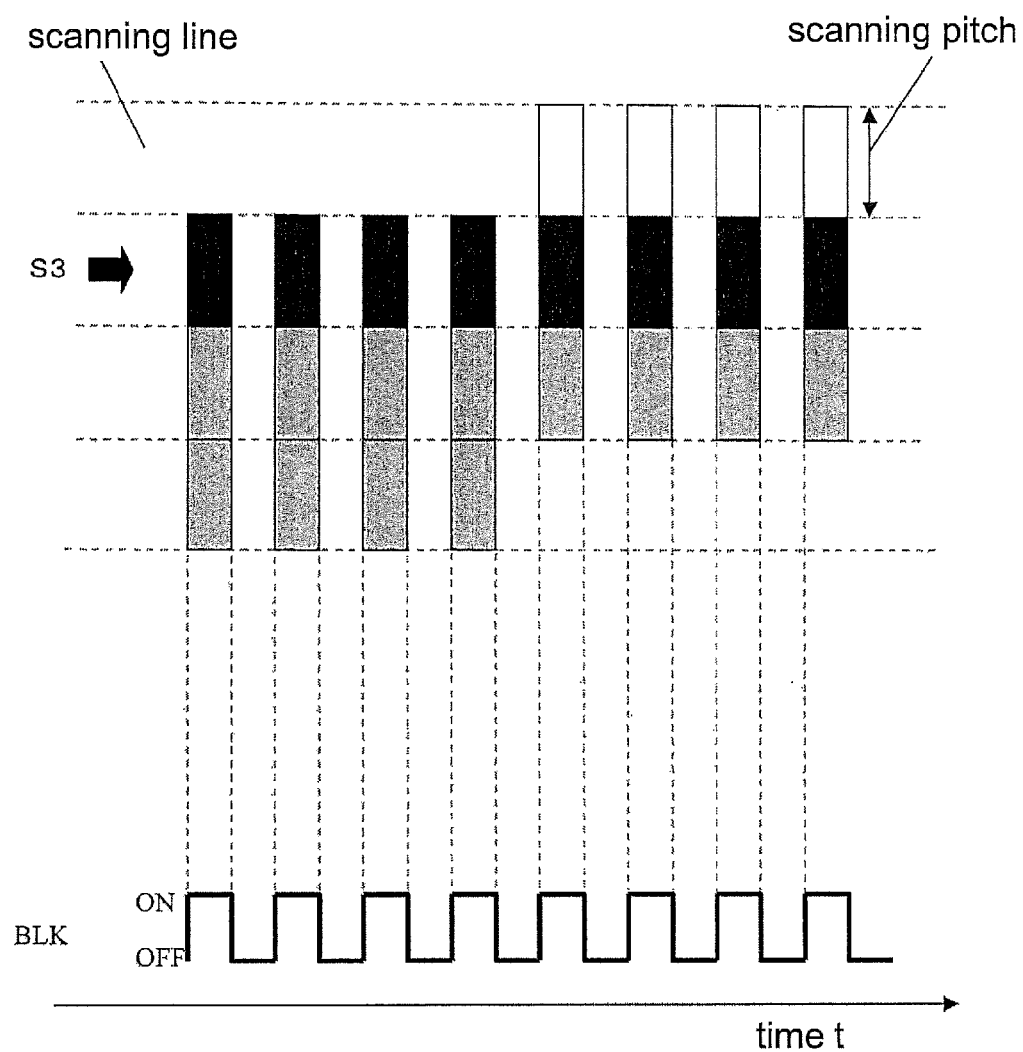
FIG. 16 is a timing chart showing a state in the process of scanning the line S3 by a drawing method according to an aspect of embodiment of the present invention.

FIG. 15 and FIG. 16 show states of drawing the scanning lines S2 and S3, respectively. Blanking operation is changed from that of FIG. 14, which resulted in drawing the black parts in the figures. (The gray parts have been drawn in the foregoing scanning.)

Figure 17:
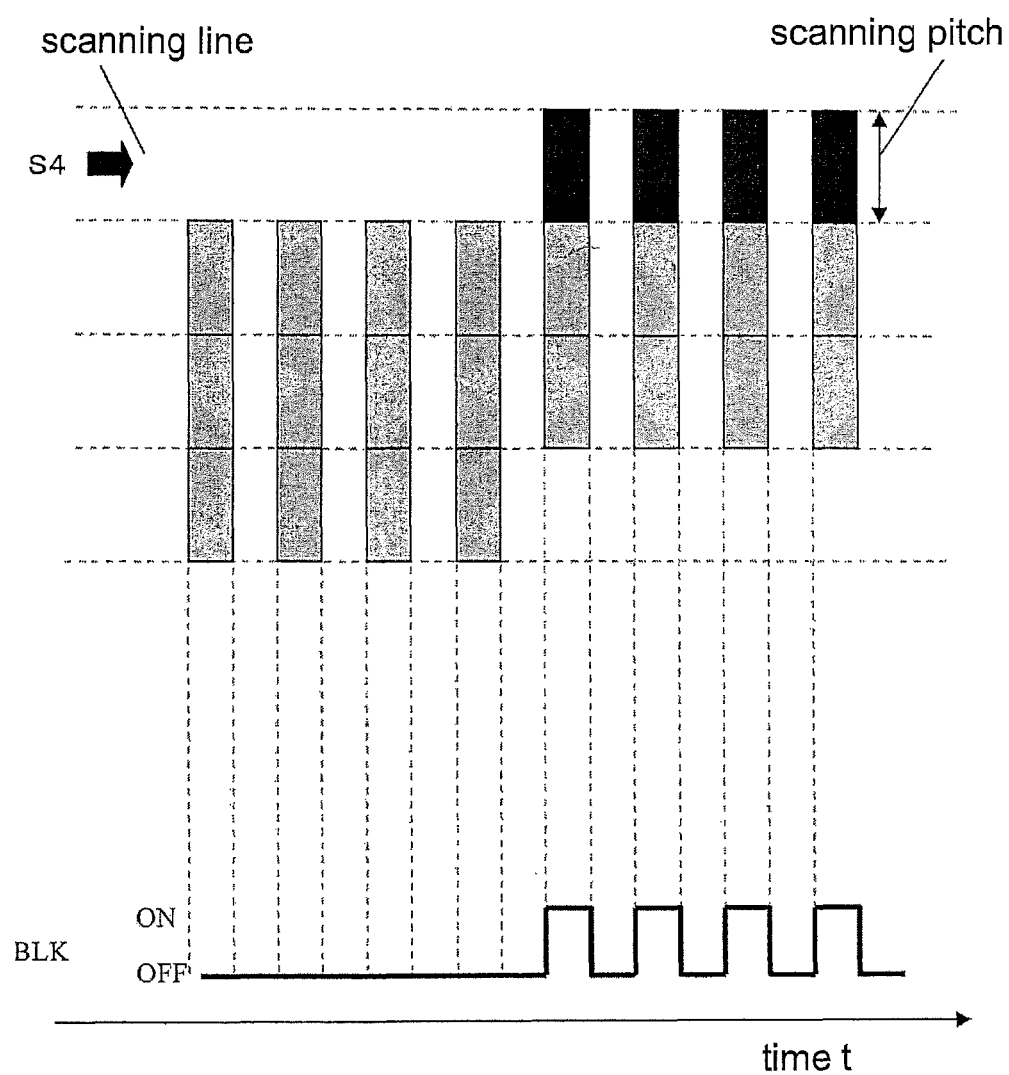
FIG. 17 is a timing chart showing a state in the process of scanning the line S4 by a drawing method according to an aspect of embodiment of the invention.

FIG. 17 shows a state of drawing a scanning line S4. Blanking operation is changed from those of FIGS. 15 and 16, which resulted in drawing the black parts in the figure. (The gray parts have been drawn in the foregoing scanning steps.)

In this way, the drawing operation proceeds by turning the BLK ON and shooting the electron beam on the places at which the scanning line overlaps with the part to be drawn.

Figure 18A:
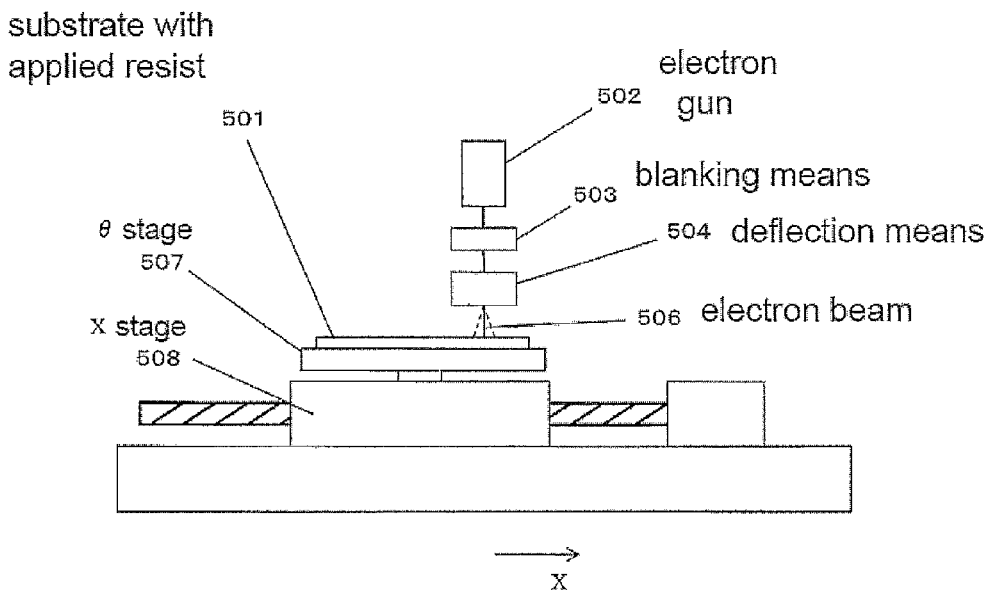
Figure 18B:
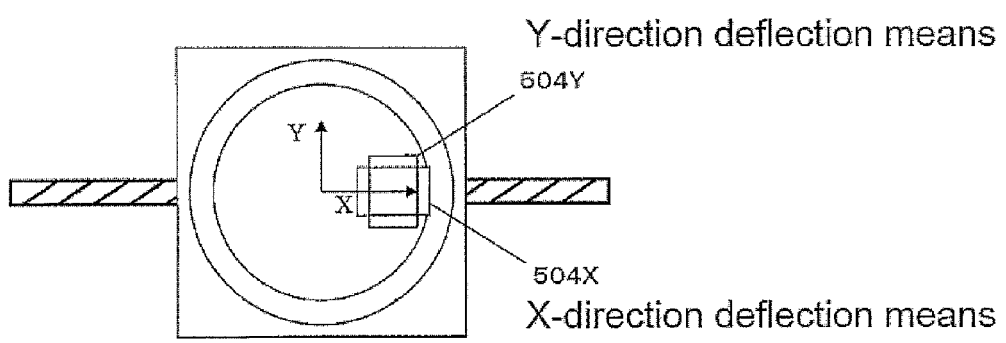

FIGS. 18(a) and 18(b) show an outline construction of an electron beam lithography apparatus. Drawing process is conducted by determining a radial position by the X stage 508 and rotating the θ stage 507 to scan the electron beam 506 along the circumferential direction. The electron beam is deflected by giving deflection signals to an X direction deflecting means 504X and a Y direction deflecting means 504Y of a deflection means 504. Blanking operation is conducted by inputting a blanking signal to the blanking means 503.

In the drawing method described above, after one round of drawing on a scanning line, scanning line is moved to the next line. The scanning line can be moved by movement of the X stage 508 or by movement of X stage 508 for coarse movement and deflection in X direction for fine movement.

This drawing method of the invention can be applied to the case of manufacturing a master disk for magnetic transfer in which an original disk is drawn preliminarily and the master disk for magnetic transfer is duplicated, and also to the case of manufacturing a master disk for magnetic transfer on which the pattern is directly drawn.

Magnetic transfer to a medium can be performed using this master disk by a method similar to the conventional process. Self servo writing can also be performed as conventional one installing a medium containing a magnetically transferred reference servo signal into an HDD.

EXAMPLE

A more specific example of the aspect of embodiment of the invention is described below. Some other examples are described as well.

Example 1

Figure 6:
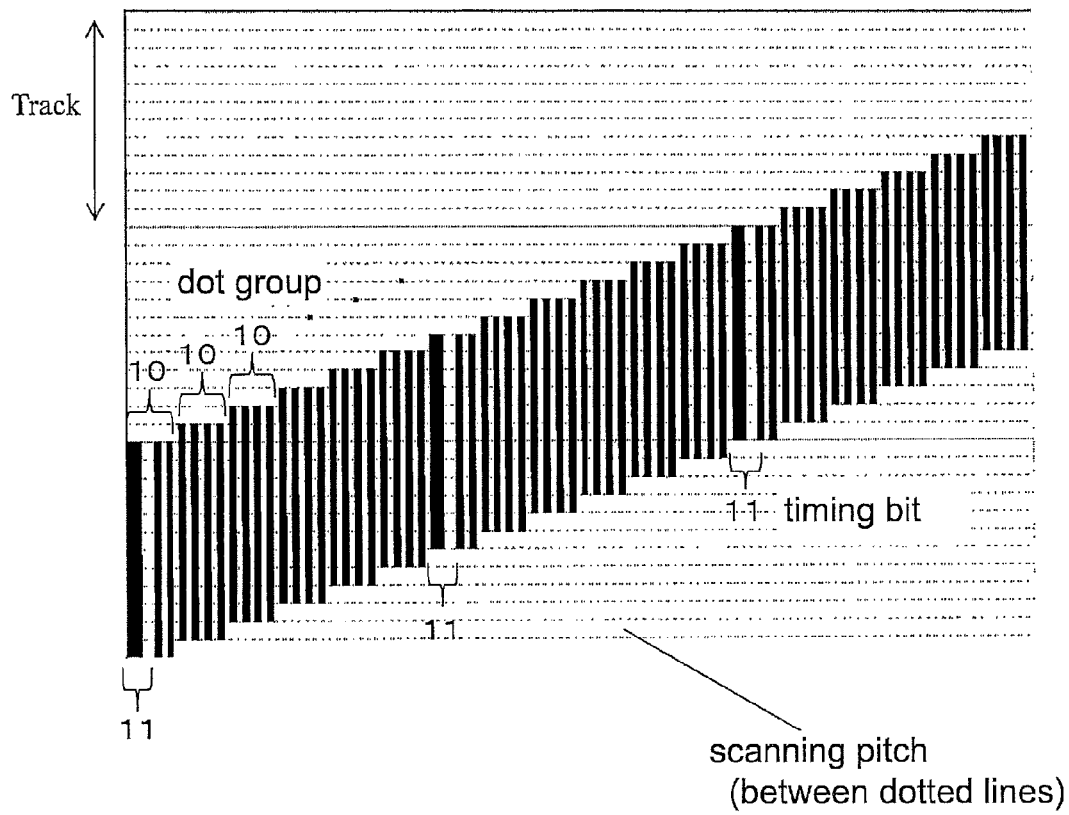
FIG. 6 shows arrangement of dots in a pattern corresponding to a reference servo signal in a spiral mode in the Example according to the invention.

This example has 12 dot groups corresponding to one track. FIG. 6 shows a pattern on the master disk for magnetic transfer of a reference servo signal in a spiral mode in this Example.

The pattern of this example contains timing bits 11 of "1100" and burst bits of "10"×22 cycles, and 103,680 bits in one round of the disk. An angle of the spiral is such a magnitude that makes a shift of a half track from a timing bit to the next timing bit. A width of one track is 96 nm.

This pattern is drawn by means of an electron beam lithography apparatus. Drawing process is executed by rotating the substrate to scan the electron beam along the circumferential direction. The scanning processes are conducted 12 times for one track with a scanning pitch in the radial direction of 8 nm.

In the pattern shown in FIG. 6, one dot group consisting of 8 bits is arranged on the same circumference. Then, the scanning pitch is shifted by an amount of one pitch in the radial direction and the next dot group of 8 bits is arranged again. These procedures are repeated.

One track in this arrangement is represented by 12 steps. Thus, a position accuracy is 1/12=8.3% for one track pitch, which is smaller than the target value of 10%.

The range of the pattern was from a radial position of 14 mm to 30 mm on the disk. Linear velocity of substrate rotation was 400 mm/s in the drawing process. It took 192 hrs for drawing the pattern in this condition.

Comparative Example

Figure 7:
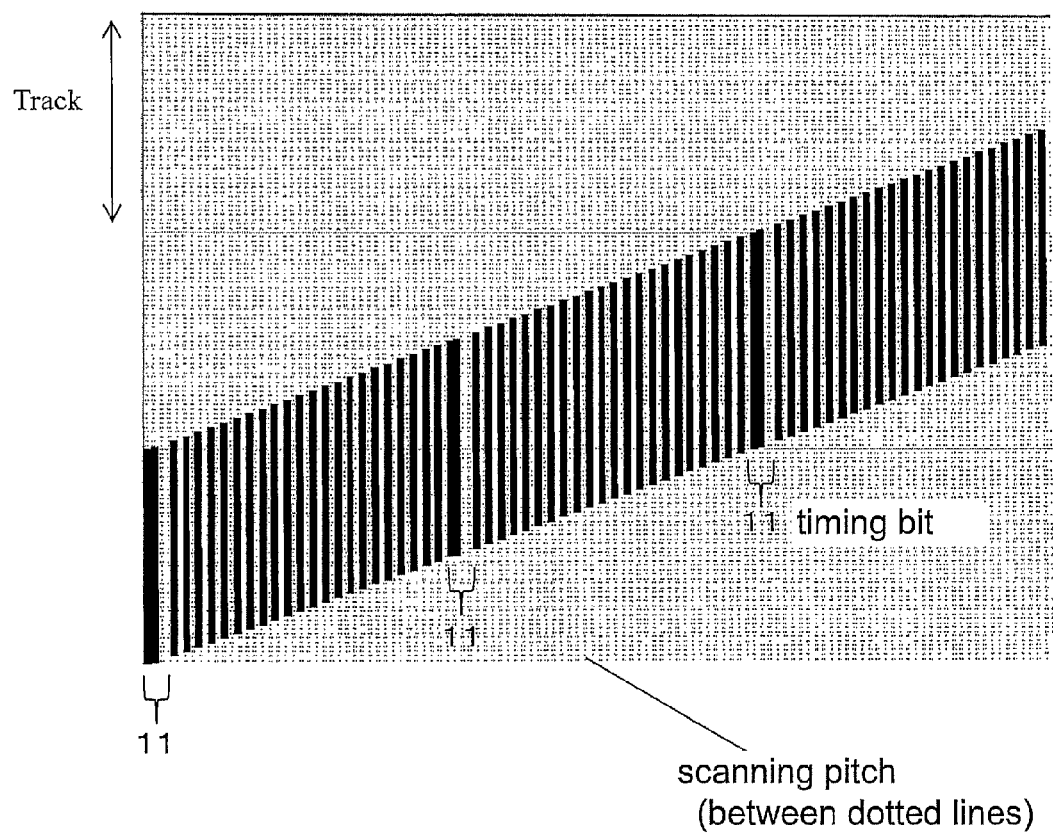
FIG. 7 shows arrangement of dots in a pattern corresponding to a reference servo signal in a spiral mode in the Comparative Example.

In this Comparative Example, the dots in the reference servo pattern in a spiral mode were not grouped to dot groups. As shown in FIG. 7, a drawing process was conducted to arrange every drawing dot shafts in the radial direction along the spiral trajectory. The dots shift 48 nm for 48 bits.

The magnitude of radial shift of adjacent drawing dots is 2 nm to draw a part of the bit "1" as shown in FIG. 7. Accordingly, the scanning pitch in the radial direction was set to be 2 nm.

Since the pattern represents one track with 48 steps, the positional accuracy for a track pitch is 1/48=2.1%, which is smaller than 10%, a target value.

The range of drawing was from a radial position of 14 mm to 30 mm as in Example 1. Linear velocity of the substrate in the drawing was 400 mm/s. It took 768 hrs to draw the pattern in these conditions. Although positional accuracy is sufficient, the drawing time is much longer than that in Example 1, which is unfavorable.

Reference Example

Figure 8:
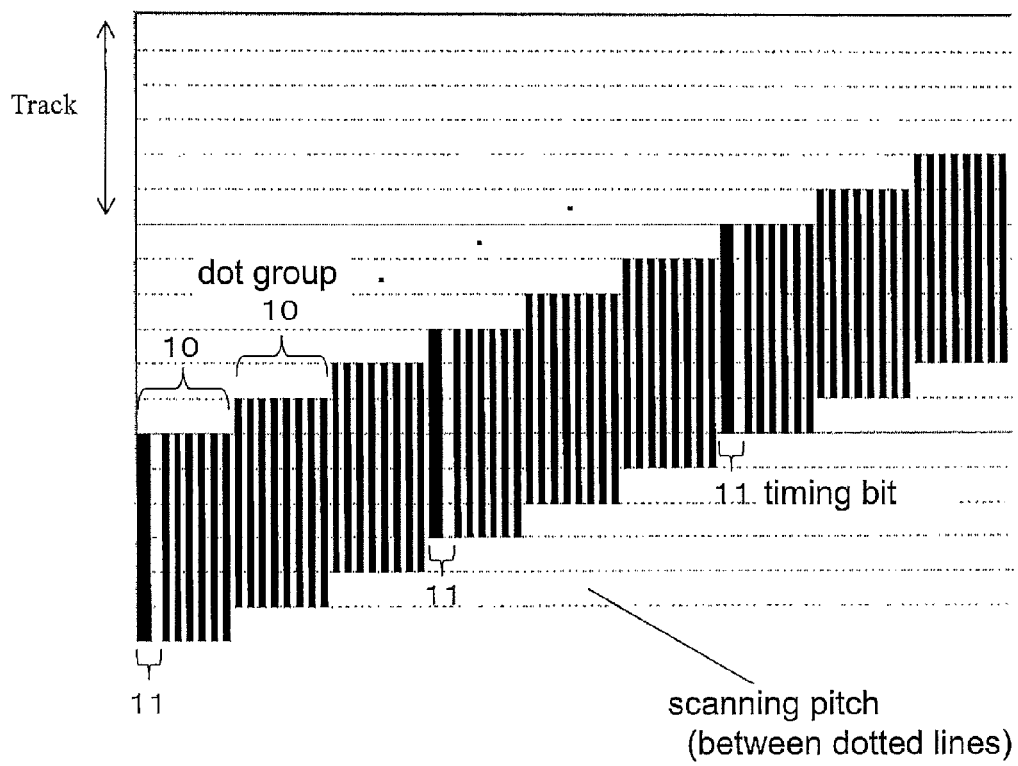
FIG. 8 shows arrangement of dots in a pattern corresponding to a reference servo signal in a spiral mode in the Reference Example.
Figure 9:
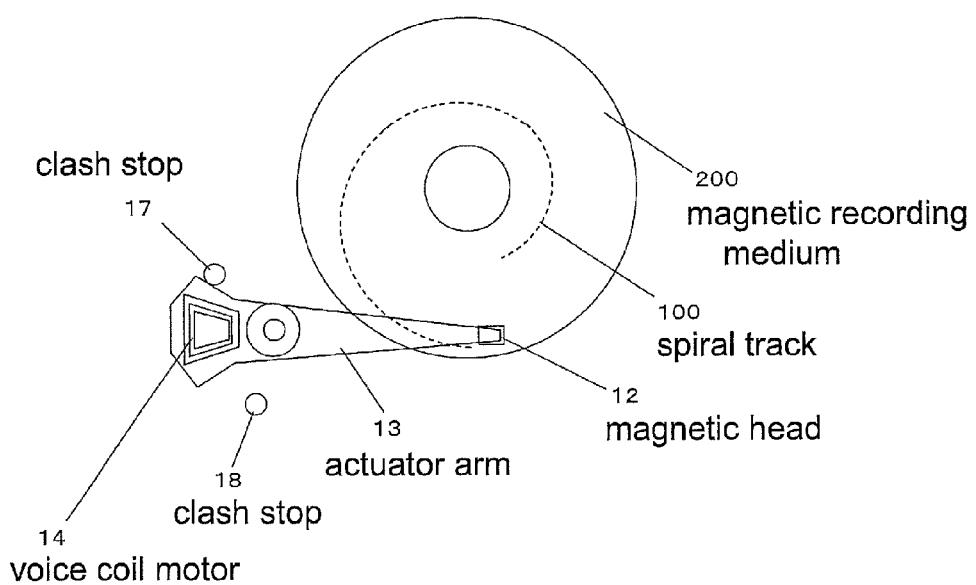
FIG. 9 shows a construction of a conventional device for recording a pattern corresponding to a reference servo signal in a spiral mode using a magnetic head.
Figure 10:
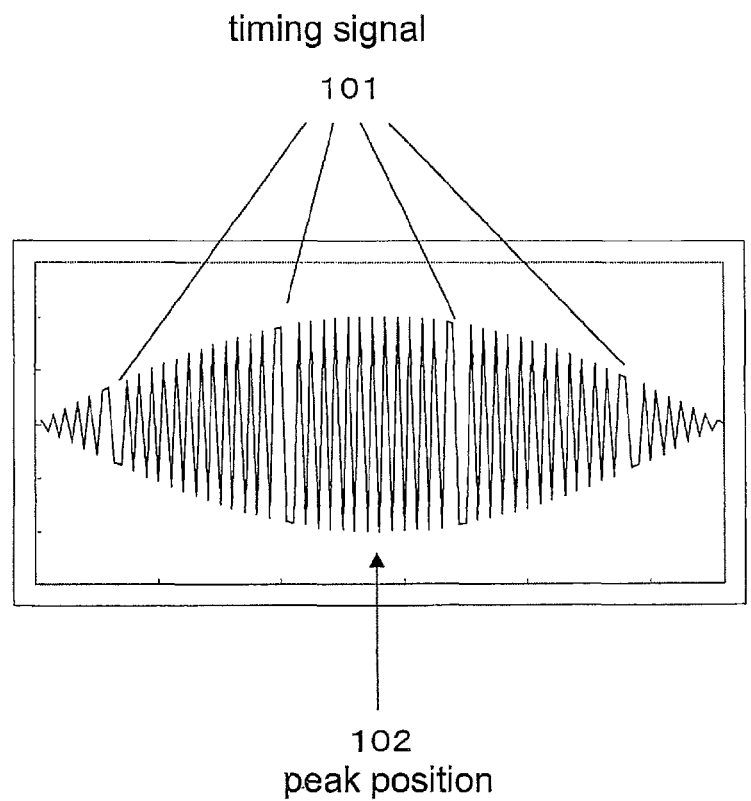
FIG. 10 is a reproduced waveform of the reference servo signal in a spiral mode in a conventional system.
Figure 11:
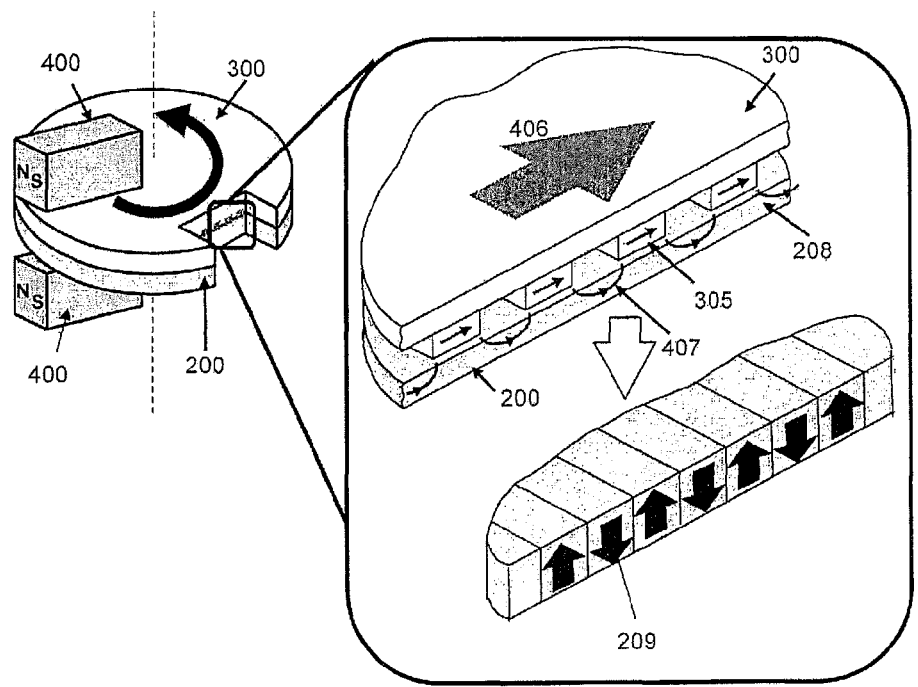
FIG. 11 is a perspective view partially cut and enlarged illustrating a principle of a magnetic transfer method, an edge transfer method, for a medium to be transferred that is a perpendicular magnetic recording medium.
Figure 12A:
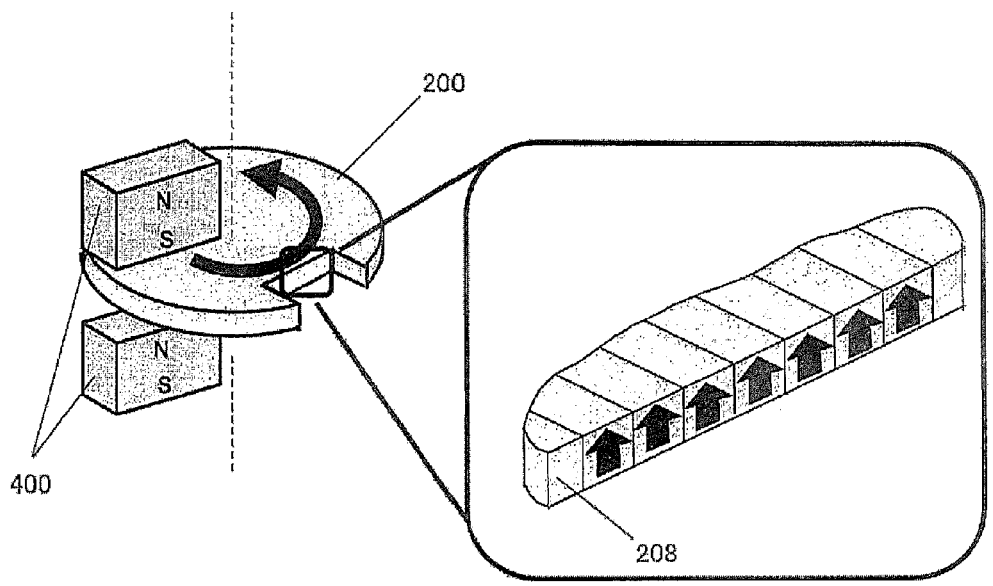
FIGS. 12(a) and 12(b) are perspective views partially cut and enlarged illustrating a principle of another magnetic transfer method, a bit transfer method, for a medium to be transferred that is a perpendicular magnetic recording medium.
Figure 12B:
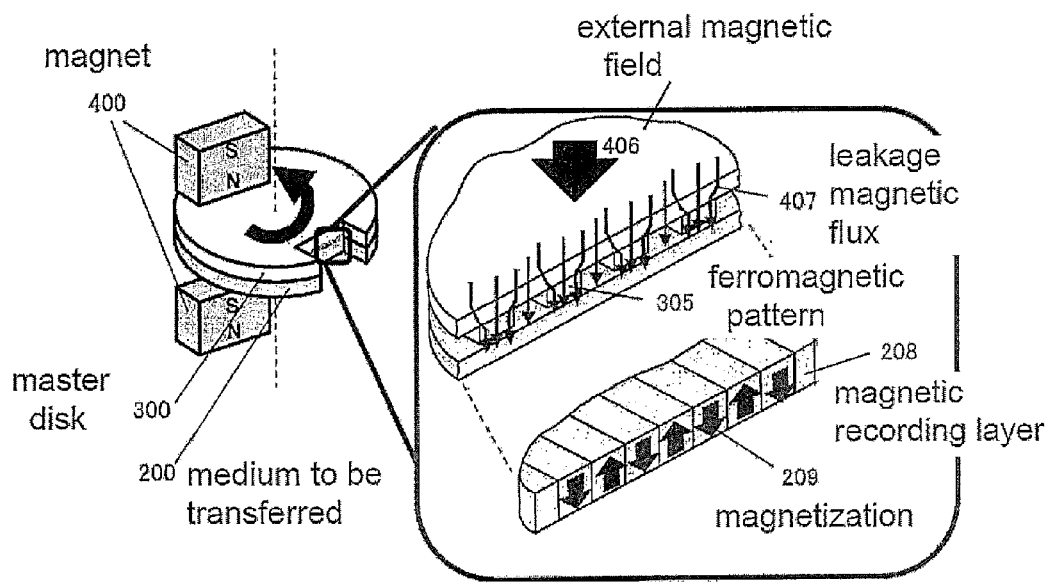
Figure 13:
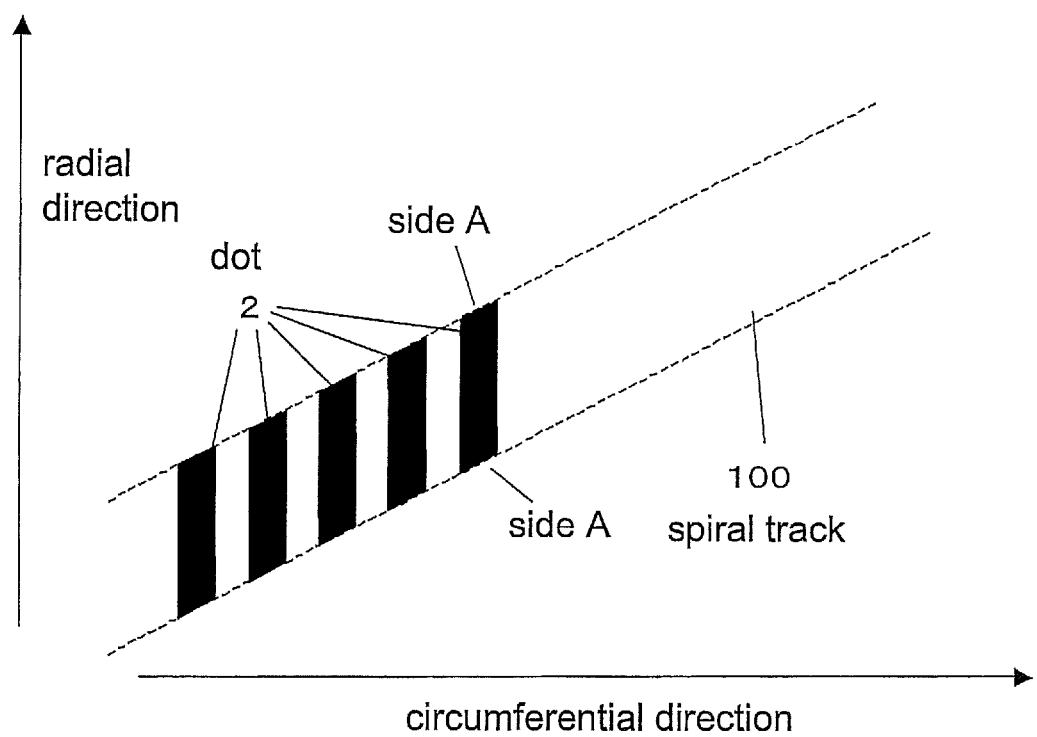
FIG. 13 shows arrangement of dots in a pattern corresponding to a reference servo signal in a spiral mode in a conventional system.

In this reference example, the number of dot groups corresponding to one track is six. As shown in FIG. 8, a reference servo pattern in a spiral mode was drawn in the condition to draw one track by six times of scanning processes.

The 16 bits consisting one dot group are arranged on the same circumference, and after shifting by one scanning pitch in radial direction (16 nm), the next one dot group consisting of 16 bits is arranged again. These processes are repeated.

Since one track in this reference example is represented by six steps, the positional accuracy is 1/6=16.7% for one track pitch, which exceeds the target value of 10%. Thus, the number of dot groups can be determined corresponding to a required positional accuracy.

What is claimed is:

1. A master disk for magnetic transfer of a reference servo signal in a spiral mode, comprising:
   a pattern of the magnetic transfer including a plurality of dots groups, disposed at different radial positions of the master disk with a first pitch, and corresponding to the reference servo signal in the spiral mode, each of the plurality of dot groups including a plurality of dots, successively disposed with a second pitch along a circumferential direction of the master disk at a same one of the radial positions, each of the plurality of dots being of a ferromagnetic material, and having four sides, two opposing sides thereof extending in the circumferential direction, the other two opposing sides thereof extending in a radial direction of the master disk.

2. The master disk of claim 1, wherein each of the plurality of dot groups corresponds to a track of the master disk and has 10 or more dots.

3. A method of drawing a pattern of magnetic transfer on a substrate, comprising:
   rotating the substrate, and scanning the substrate, using an electron beam, in a circumferential direction; and
   performing blank operations to turn irradiation of the electron beam on and off, so as to draw the pattern of the magnetic transfer including a plurality of dots groups at different radial positions with a first pitch, each of the plurality of dot groups including a plurality of dots, successively disposed with a second pitch along a circumferential direction of the master disk at a same one of the radial positions, each of the plurality of dots having four sides, two opposing sides thereof extending in the circumferential direction, the other two opposing sides thereof extending in a radial direction of the master disk.

4. The method of claim 3, wherein the scanning is repeated ten times or more for one track on the substrate.

* * * * *